United States Patent
Weisenberg et al.

(10) Patent No.: US 10,240,707 B2
(45) Date of Patent: Mar. 26, 2019

(54) SPINNER ASSEMBLY FOR APPLYING LINING MATERIALS IN PIPES

(71) Applicants: Kent Weisenberg, Fruit Cove, FL (US); Shane Rowan, Jacksonville, FL (US)

(72) Inventors: Kent Weisenberg, Fruit Cove, FL (US); Shane Rowan, Jacksonville, FL (US)

(73) Assignee: SIPP TECHNOLOGIES, LLC, Wichita, KS (US)

( * ) Notice: Subject to any disclaimer, the term of this patent is extended or adjusted under 35 U.S.C. 154(b) by 0 days.

(21) Appl. No.: 15/673,576

(22) Filed: Aug. 10, 2017

(65) Prior Publication Data

US 2018/0326444 A1 Nov. 15, 2018

Related U.S. Application Data

(60) Provisional application No. 62/504,043, filed on May 10, 2017.

(51) Int. Cl.

| | |
|---|---|
| B05C 11/10 | (2006.01) |
| B05C 7/08 | (2006.01) |
| F16L 55/1645 | (2006.01) |
| B05B 13/06 | (2006.01) |
| B05D 1/00 | (2006.01) |
| B05D 1/26 | (2006.01) |
| B05D 7/22 | (2006.01) |
| B29C 47/02 | (2006.01) |
| F16L 58/10 | (2006.01) |
| B05C 7/02 | (2006.01) |
| B29L 23/00 | (2006.01) |

(52) U.S. Cl.
CPC ...... *F16L 55/1645* (2013.01); *B05B 13/0636* (2013.01); *B05C 7/08* (2013.01); *B05C 11/1005* (2013.01); *B05D 1/005* (2013.01); *B05D 1/265* (2013.01); *B05D 7/222* (2013.01); *B29C 47/022* (2013.01); *F16L 58/1027* (2013.01); *B05C 7/02* (2013.01); *B29L 2023/22* (2013.01)

(58) Field of Classification Search
USPC ......... 118/306, 317, 323; 239/226, 752, 753
See application file for complete search history.

(56) References Cited

U.S. PATENT DOCUMENTS

| | | | | |
|---|---|---|---|---|
| 4,414,918 A | * | 11/1983 | Nelson Holland | B05B 13/06 118/306 |
| 2003/0045098 A1 | * | 3/2003 | Verhaverbeke | H01L 21/67069 438/689 |

* cited by examiner

*Primary Examiner* — Yewebdar T Tadesse
(74) *Attorney, Agent, or Firm* — Thomas C. Saitta

(57) ABSTRACT

A spinner apparatus for applying lining material to the interior of a pipe, the spinner apparatus having a cylindrical material accelerator coaxially positioned about a distribution manifold, the distribution manifold having a plurality of equally spaced, radially oriented slots extending from an axial chamber that receives lining material, wherein lining material is extruded through the slots onto the interior of the material accelerator and slung onto the pipe interior in an annular pattern. Movement of the spinner apparatus along the pipe produces a tubular lining member.

20 Claims, 3 Drawing Sheets

SPINNER ASSEMBLY FOR APPLYING LINING MATERIALS IN PIPES

This application claims the benefit of U.S. Provisional Patent Application Ser. No. 62/504,043, filed May 10, 2017, the disclosure of which is incorporated herein by reference.

BACKGROUND OF THE INVENTION

This invention applies generally to the field of devices adapted to spray or coat the inner surfaces of a pipe or other member, primarily for the rehabilitation and/or lining of pipes or other tubular members, wherein a polymer resin or similar uncured polymer material is sprayed onto the interior wall of the pipe, the sprayed material curing to form a layer possessing desirable properties, such as liquid impermeability, elasticity, rigidity, corrosion resistance, etc. The lining material may be applied directly to the pipe wall itself, or successive layers may be applied to create multiple layers. The invention relates to such devices which are spinning assemblies transported along the interior of the pipe, the spinner assembly having a rotating material accelerator that receives and distributes the uncured polymer material circumferentially as it moves linearly along the pipe, the spinner assembly being mounted onto a transport unit, either self-propelled or towed. More particularly, the invention relates to a spinner assembly having structures adapted to optimize the distribution of uncured polymer liner material within the spinner assembly so as to optimize the delivery of liner material expelled from the spinner assembly onto the pipe inner wall.

There are currently only a few methods to rehabilitate a pipe system to full structural integrity without excavating and replacing pipe segments. The current methods include Cast-In-Place-Pipe (CIPP) and Spray-In-Place-Pipe (SIPP). In the current SIPP methods, a SIPP spraying apparatus is typically pulled through the pipe by a polymer resin supplying tether, known as the umbilical. The uncured polymer material is supplied from containers or reservoirs located externally to the pipe. The spraying apparatus comprises a spinner member that ejects the lining material onto the inner diameter of the pipe, effectively creating a new pipe with a known thickness and structural properties inside the pre-existing pipe once the polymer liner material cures.

It is an objective of this invention is to provide an improved spinner assembly adapted for use within a spraying apparatus, device or assembly, the spinner assembly having an improved structure and process to optimize the distribution of liner material within the spinner assembly so as to optimize the distribution of the liner material expelled from the spraying apparatus onto the interior wall of the pipe.

SUMMARY OF THE INVENTION

Figure 1:
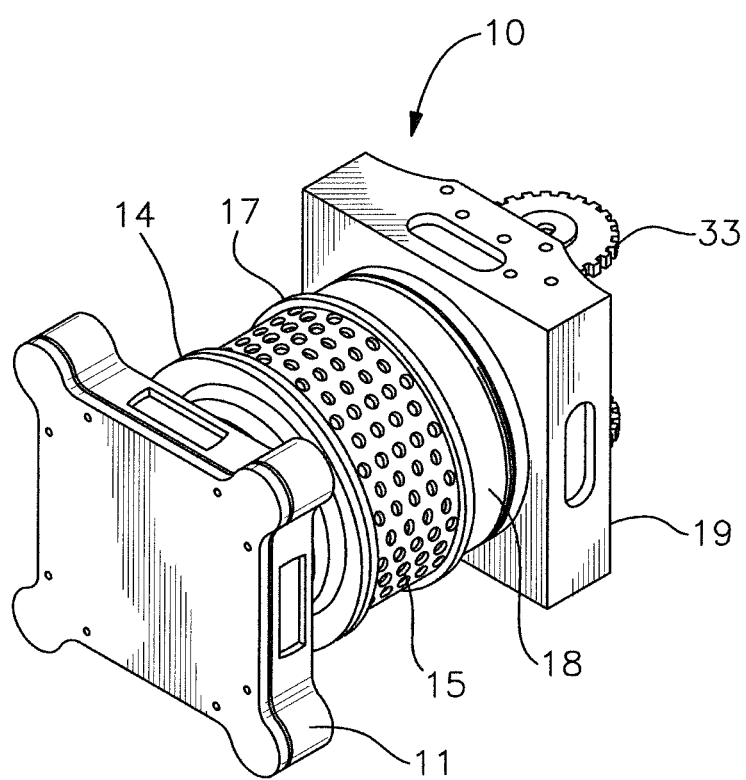
FIG. 1 is a perspective view of a representative embodiment of the invention.

The invention is an improved spinner assembly adapted and structured to line the interior of a pipe or similar tubular member with an annular layer of curable lining material, such as for example a polymer or polymer resin, that cures to form a tubular liner or layer within the pipe, the spinner assembly being part of for example a SIPP spraying apparatus. The spinner assembly expels the lining material radially to create an annular coating as it is moves linearly through the pipe. The spinner assembly comprises a static distribution manifold disposed internally to a rotating material accelerator, such as for example a tubular apertured member, the distribution manifold receiving and then evenly extruding the uncured lining material in multiple directions onto the interior of the rotating material accelerator, whereupon the lining material is expelled through apertures over a range of 360 degrees onto the pipe wall.

The distribution manifold comprises a plurality of equally spaced, radially-extending slots, there being preferably four such radial slots spaced at 90-degree intervals, wherein the slot openings for each radial slot are oriented substantially parallel to the central axis of the distribution manifold. The distribution manifold further comprises a centrally-located axial chamber adapted to receive uncured lining material delivered under pressure from an external source through an inlet port, whereby the lining material is equally divided and delivered through the radial slots onto the interior of the rotating material accelerator. The lining material passes through the apertures of the material accelerator and is expelled onto the pipe wall. The cross-sectional area of the inlet port is most preferably equal to the combined cross-sectional area of all of the slot openings. If needed for this, a shoulder or similar reducing structure may be disposed between the inlet port and the axial chamber such that the diameter of the axial chamber is less than the diameter of the inlet port.

In alternative language, the invention is a spinner assembly adapted to expel lining material onto the interior surface of a tubular member, said assembly comprising a rotating material accelerator comprising an apertured tubular body; and a static distribution manifold disposed coaxially and concentrically within said material accelerator, said distribution manifold comprising a plurality of radially extending slots, said slots being equally spaced circumferentially and adapted to extrude lining material onto the interior of said material accelerator. Furthermore, the invention wherein said distribution manifold further comprising a central axis, and wherein said slots are aligned substantially parallel to said central axis; further comprising slot openings, and wherein said slot openings are aligned substantially parallel to said central axis; further comprising a central axis and each of said slots further comprising a maximum longitudinal linear dimension, and wherein said maximum longitudinal linear dimension of each of said slots is aligned substantially parallel to said central axis; each of said slot openings further comprising a maximum longitudinal linear dimension, and wherein said maximum longitudinal linear dimension of each of said slot openings is aligned substantially parallel to said central axis; further comprising slot openings, an axial chamber in communication with said slots and an inlet port in communication with said axial chamber, said inlet port adapted to receive lining material; said slot openings each having a cross-sectional area and said inlet port having a minimum cross-sectional area, wherein the minimum cross-sectional area of said inlet port is substantially equal to the total combined cross-sectional of said slot opening; and/or said inlet port further comprising a reducing transition structure.

Alternatively still, a spinner assembly adapted to expel lining material onto the interior surface of a tubular member, said assembly comprising a rotating material accelerator comprising an apertured tubular body; a static distribution manifold disposed coaxially and concentrically within said material accelerator, said distribution manifold comprising a plurality of radially extending slots, said slots being equally spaced circumferentially and adapted to extrude lining material onto the interior of said material accelerator; said distribution manifold further comprising a central axis and slot openings, and wherein each of said slot openings comprise a maximum longitudinal linear dimension and wherein said maximum longitudinal linear dimension of each of said slot openings is aligned substantially parallel to said central axis; said distribution manifold further comprising an axial chamber in communication with said slots and an inlet port in communication with said axial chamber, said inlet port adapted to receive lining material; said slot openings each having a cross-sectional area and said inlet port having a minimum cross-sectional area, wherein the minimum cross-sectional area of said inlet port is substantially equal to the total combined cross-sectional of said slot openings. Furthermore, the invention wherein said inlet port further comprising a reducing transition structure; and/or wherein the sizing of said slot openings and the sizing of said inlet port is such that the flow of lining material into said inlet port is equal to the combined flow of lining material from all of said slot openings.

DETAILED DESCRIPTION OF THE INVENTION

With reference to the drawings, the invention will be described. The drawings are provided for descriptive and illustrative purposes and are not intended to be limiting as to the scope and definition of the invention.

In general, the invention in various embodiments comprises a spinner assembly 10 with an annular material accelerator 15 that expels an uncured polymer, polymer resin or similar lining material radially and circumferentially, thereby forming an annular strip of coating covering a 360-degree interior section of a pipe or other tubular member. The spinner assembly 10 is mounted to or forms part of a SIPP spraying apparatus that is transported linearly along the interior of the pipe in any known manner, such that the annular coating deposited by the spinner assembly 10 forms an extended tubular lining.

Figure 2:
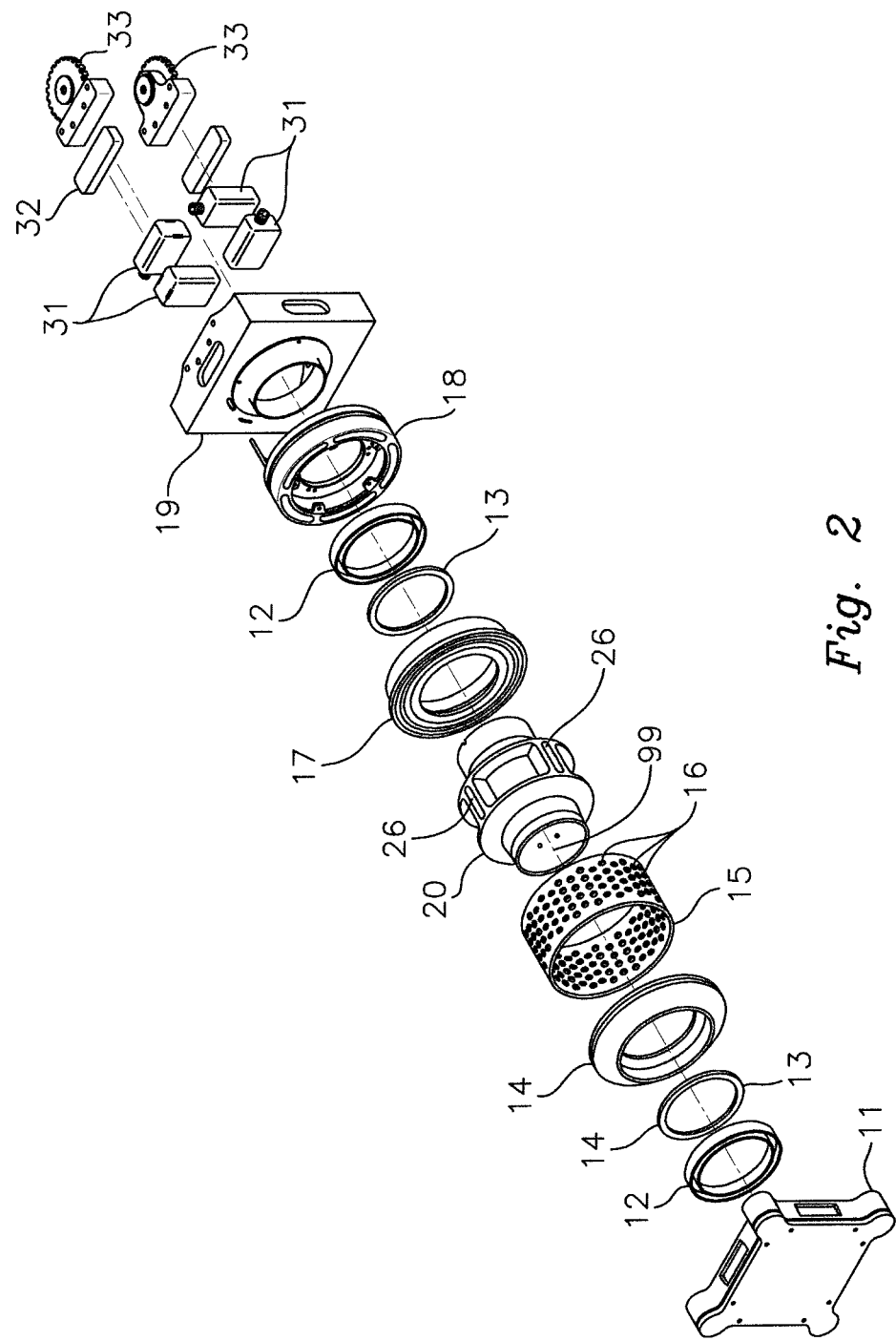
FIG. 2 is an expanded view of the embodiment of FIG. 1.

A representative embodiment of a spinner assembly 10 is shown in FIGS. 1 and 2, and it is to be understood that other embodiments of a spinner assembly with greater, fewer or differing components may be improved by providing a distribution manifold 20 as described herein. In the embodiment shown, and designating the elements in order from the distal end to the proximal end, the spinner assembly 10 is shown to comprise in combination a sensor unit 11, which may house for example proximity or thickness sensors 31 to measure the inner diameter of the pipe liner as it is applied, a bearing 12, a static shield 13, a rotating shield 14, a static distributor manifold 20, an annular, rotating material accelerator 15 having apertures 16 for passage of the lining material, a rotating shield and rotor assembly 17, a motor 18 which rotates the material accelerator 15 and rotating shields 15/17, and a mount 19. Further as shown, this representative embodiment of a suitable spinner assembly 10 structure may further comprise another set or array of sensors 31, such as used to measure the interior dimension of the pipe prior to spraying the lining material, shim blocks 32 and pivot gears 33. The spinner assembly 10 will be in fluid communication with a supply of lining material, typically stored externally to the pipe and pumped through a conduit system, hoses for example, to the spinner assembly 10.

As shown in FIG. 2, the spinner assembly 10 comprises a static, i.e., non-rotating, distribution manifold 20, the outer diameter of which is less than the inner diameter of the rotating material accelerator 15 to provide dimensional clearance when material accelerator 15 is operational. The material accelerator 15 is a tubular, sleeve-like body having a plurality of apertures 16, i.e., holes, slots or the like, dispersed generally evenly or symmetrically about the tubular body. The distribution manifold 20 is positioned internally to the extruder screen 15 such that the material accelerator 15 is coaxially and concentrically associated with the distribution manifold 20. Lining material extruded by the distribution manifold 20 adheres to the material accelerator 15, then is centrifugally accelerated through the apertures 16 and projected towards the inner pipe surface.

Figure 3:
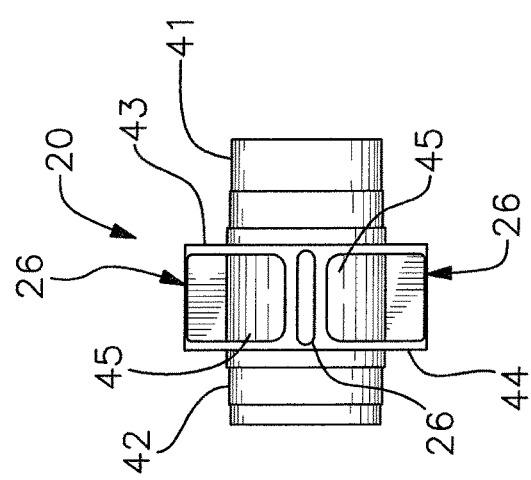
FIG. 3 is a plan view of an embodiment of the distribution manifold of the invention.
Figure 4:
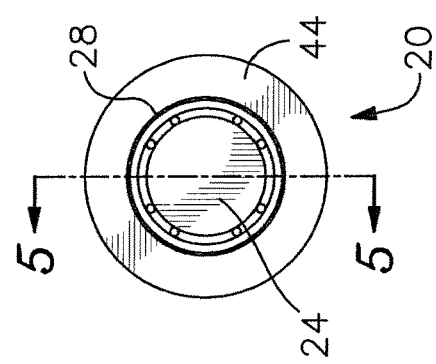
FIG. 4 is an end view of the distribution manifold of FIG. 3.
Figure 5:
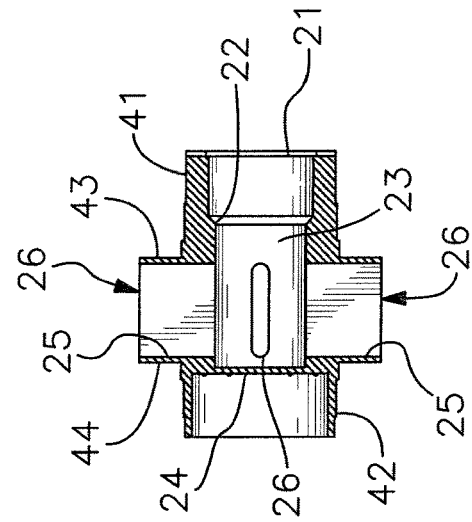
FIG. 5 is a cross-sectional view of the distribution manifold of FIG. 3 taken along line 5-5 of Figure.

As shown in FIGS. 3-5, the distribution manifold 20 comprises in general an inlet port 21, an axial chamber 23 having a distal wall 24, and a plurality of slots 25 extending radially from the axial chamber 23, each slot 25 terminating in an external slot opening 26. The distribution manifold further comprises a proximal tubular end 41, a distal tubular or cylindrical end 42, a proximal flange wall 43, and a distal flange wall 44. The radial slots 25 and the slot openings 26 are located between the proximal flange wall 43 and the distal flange wall 44, and recesses 45 may be provided between the flange walls 43/44 and the slots 25. The radial slots 25 and slot openings 26 are oriented to be substantially or literally parallel to the central axis 99 of the distribution manifold 20, in a manner such that the maximum longitudinal cross-sectional linear dimensions of the radial slots 25 and the slot openings 26 are substantially or literally parallel to the central axis 99 of the distribution manifold 20.

The inlet port 21 is adapted to communicate with a lining material supply conduit (not shown) such that uncured lining material may be delivered into the inlet port 21. The inlet port 21 is also in communication with the axial chamber 23. Axial chamber 23 is cylindrical in shape and coaxially centered on the central axis 99 of the distribution manifold 20. The end of the axial chamber 23 comprises a distal wall 24, such that all lining material is extruded in the radial direction through slots 25. The slots 25 communicate with and extend radially from the axial chamber 23, such that lining material delivered under pressure into the axial chamber from the inlet port 21 is pushed into the slots 25 for extrusion through slot openings 26.

At least two and preferably four slots 25 are provided. The slots 25 and slot openings 26 are equally spaced circumferentially about the distribution manifold 20. Thus, for a distribution manifold 20 with two slots 25, the slots 25 will be separated by 180 degrees, three slots 25 will be separated by 120 degrees, four slots 25 will be separated by 90 degrees, etc. The slots 25 are preferably identical in size and shape, as the purpose of the symmetrically disposed slots 25 is to insure the lining material is evenly discharged from the distribution manifold 20 onto the material accelerator 15. It is most preferred that the inflow volume of lining material delivered under pressure through the inlet port 21 be substantially equal to the total combined outflow volume of lining material extruded from the slots 25, which is accomplished by matching the minimum cross-sectional area of the inlet port 21 to the combined cross-sectional areas of the slot openings 26, such that the minimum cross-sectional area of the inlet port 21 is substantially equal to the total combined cross-sectional areas of the slot openings 26. If necessary to achieve this matching, the inlet port 21 may be provided with a reduction in cross-sectional area, such as by tapering the interior of the inlet port or providing a shoulder or similar transition structure 22, as seen in FIG. 5. Such a structure may provide a venturi effect on the delivered lining material. For example, for an embodiment of the distribution manifold 20 having four slots and an inlet port 21 having a cross-sectional opening of 40 square inches, the cross-sectional area of each slot 25 will be ten square inches.

It is understood that equivalents and substitutions for certain elements set forth above may be obvious to those of ordinary skill in the art, and therefore the true scope and definition of the invention is to be as set forth in the following claims.

We claim:

1. A spinner assembly adapted to expel lining material onto the interior surface of a tubular member, said spinner assembly comprising:
a rotating material accelerator comprising a tubular body having a plurality of apertures distributed circumferentially and axially on said tubular body;
a static distribution manifold disposed coaxially and concentrically within said rotating material accelerator, said static distribution manifold comprising a central axis, an inlet port disposed within a proximal tubular end, an axial chamber in communication with said inlet port; a plurality of radially extending slots in communication with said axial chamber and comprising slot openings, said plurality of radially extending slots being equally spaced circumferentially and adapted to extrude lining material through said slot openings onto the interior of said rotating material accelerator, said plurality of radially extending slots extending radially outward from said axial chamber such that said slot openings are disposed beyond said proximal tubular end in the radial direction; and
wherein said static distribution manifold is disposed within said rotating material accelerator such that the axial distribution of said plurality of apertures of said tubular body of said rotating material accelerator is such that said plurality of apertures is axially coextensive with and positioned radially outward from said slot openings.

2. The spinner assembly of claim 1, wherein said plurality of radially extending slots are aligned substantially parallel to said central axis.

3. The spinner assembly of claim 2, wherein said slot openings are aligned substantially parallel to said central axis.

4. The spinner assembly of claim 2, each of said slot openings comprising a maximum longitudinal linear dimension, and wherein said maximum longitudinal linear dimension of each of said slot openings is aligned substantially parallel to said central axis.

5. The spinner assembly of claim 2, said slot openings each having a cross-sectional area and said inlet port having a minimum cross-sectional area, wherein the minimum cross-sectional area of said inlet port is substantially equal to the total combined cross-sectional of said slot openings.

6. The spinner assembly of claim 5, said inlet port further comprising a reducing transition structure.

7. The spinner assembly of claim 1, said static distribution manifold further comprising a central axis and each of said plurality of radially extending slots further comprising a maximum longitudinal linear dimension, and wherein said maximum longitudinal linear dimension of each of said slots is aligned substantially parallel to said central axis.

8. The spinner assembly of claim 7, said slot openings each having a cross-sectional area and said inlet port having a minimum cross-sectional area, wherein the minimum cross-sectional area of said inlet port is substantially equal to the total combined cross-sectional of said slot openings.

9. The spinner assembly of claim 8, said inlet port further comprising a reducing transition structure.

10. The spinner assembly of claim 1, said slot openings each having a cross-sectional area and said inlet port having a minimum cross-sectional area, wherein the minimum cross-sectional area of said inlet port is substantially equal to the total combined cross-sectional of said slot openings.

11. The spinner assembly of claim 10, said inlet port further comprising a reducing transition structure.

12. The spinner assembly of claim 1, said inlet port further comprising a reducing transition structure.

13. The spinner assembly of claim 1, said static distribution manifold further comprising a proximal flange wall and a distal flange wall, wherein said plurality of radially extending slots are positioned between said proximal flange wall and said distal flange wall, and wherein said proximal flange wall and said distal flange wall extend beyond said proximal tubular end in the radial direction.

14. The spinner assembly of claim 13, wherein said slot openings are positioned between said proximal flange wall and said distal flange wall.

15. A spinner assembly adapted to expel lining material onto the interior surface of a tubular member, said spinner assembly comprising:
a rotating material accelerator comprising a tubular body having a plurality of apertures distributed circumferentially and axially on said tubular body;
a static distribution manifold disposed coaxially and concentrically within said rotating material accelerator, said static distribution manifold comprising a plurality of radially extending slots, said plurality of radially extending slots being equally spaced circumferentially and adapted to extrude lining material onto the interior of said rotating material accelerator;
said static distribution manifold further comprising a central axis and slot openings, and wherein each of said slot openings comprise a maximum longitudinal linear dimension and wherein said maximum longitudinal linear dimension of each of said slot openings is aligned substantially parallel to said central axis;
said static distribution manifold further comprising an inlet port disposed within a proximal tubular end, an axial chamber in communication with said plurality of radially extending slots and an inlet port in communication with said axial chamber, said inlet port adapted to receive lining material;
said slot openings each having a cross-sectional area and said inlet port having a minimum cross-sectional area, wherein the minimum cross-sectional area of said inlet port is substantially equal to the total combined cross-sectional of said slot openings;
said plurality of radially extending slots extending radially outward from said axial chamber such that said slot openings are disposed beyond said proximal tubular end in the radial direction.

16. The spinner assembly of claim 15, said inlet port further comprising a reducing transition structure.

17. The spinner assembly of claim 15, wherein the sizing of said slot openings and the sizing of said inlet port is such that the flow of lining material into said inlet port is equal to the combined flow of lining material from all of said slot openings.

18. The spinner assembly of claim 15, said static distribution manifold further comprising a proximal flange wall and a distal flange wall, wherein said plurality of radially extending slots and said slot openings are positioned between said proximal flange wall and said distal flange wall, and wherein said proximal flange wall and said distal flange wall extend beyond said proximal tubular end in the radial direction.

19. The spinner assembly of claim 15, wherein said static distribution manifold is disposed within said rotating material accelerator such that the axial distribution of said plurality of apertures of said tubular body of said rotating material accelerator is such that said plurality of apertures is axially coextensive with and positioned radially outward from said slot openings.

20. The spinner assembly of claim 15, wherein said slot openings are aligned substantially parallel to said central axis and wherein said plurality of apertures of said tubular body of said rotating material accelerator are positioned adjacent to said slot openings.

* * * * *